(12) United States Patent
Minnis et al.

(10) Patent No.: US 6,954,628 B2
(45) Date of Patent: Oct. 11, 2005

(54) RADIO RECEIVER

(75) Inventors: Brian J. Minnis, Crawley (GB); Paul A. Moore, Seaford (GB)

(73) Assignee: Koninklijke Phillips Electronics N.V., Eindhoven (NL)

( * ) Notice: Subject to any disclaimer, the term of this patent is extended or adjusted under 35 U.S.C. 154(b) by 695 days.

(21) Appl. No.: 09/992,909

(22) Filed: Nov. 5, 2001

(65) Prior Publication Data

US 2002/0065060 A1 May 30, 2002

(30) Foreign Application Priority Data

Nov. 24, 2000 (GB) .............................................. 0028652

(51) Int. Cl.$^7$ ............................. H04M 1/00; H04B 1/10
(52) U.S. Cl. ................. 455/324; 455/552.1; 455/553.1; 455/556.1; 375/329; 375/334; 375/350
(58) Field of Search ................. 455/323, 324, 455/552.1, 553.1, 550.1; 375/322, 324, 328, 329, 334, 350

(56) References Cited

U.S. PATENT DOCUMENTS

| | | | | |
|---|---|---|---|---|
| 5,448,201 A | * | 9/1995 | Kawabata | 329/304 |
| 5,822,704 A | * | 10/1998 | Ishii | 455/553.1 |
| 5,950,119 A | * | 9/1999 | McGeehan et al. | 455/302 |
| 5,982,807 A | * | 11/1999 | Snell | 375/146 |
| 6,675,024 B1 | * | 1/2004 | Loke et al. | 455/553.1 |
| 6,683,919 B1 | * | 1/2004 | Olgaard et al. | 375/316 |
| 6,778,594 B1 | * | 8/2004 | Liu | 375/222 |

FOREIGN PATENT DOCUMENTS

| | | | |
|---|---|---|---|
| EP | 0797292 A1 | 9/1997 | H03D/3/00 |
| WO | WO0022735 | 4/2000 | H03M/3/02 |

OTHER PUBLICATIONS

By M.J. Gringell, Entitled: "Single Sideband Modulation Using Sequence Asymmetric Polyphase Networks", Electronic Communications, No. 48, 1973, pp. 20–25.

* cited by examiner

*Primary Examiner*—Huyen Le
*Assistant Examiner*—Tuan Pham
(74) *Attorney, Agent, or Firm*—Aaron Waxler (57) ABSTRACT

A radio receiver is configurable to operate in both low-IF and zero-IF modes with maximum re-use of of analogue and digital circuitry between modes. The receiver comprises a quadrature down-converter for generating in-phase (I) and quadrature (Q) signals at an intermediate frequency and a complex filter for performing image rejection filtering. In the low-IF mode, one of the outputs (Q) of the filter is terminated, the other (I) is digitised by a non-complex ADC then the digital signal is filtered and decimated. Quadrature-related IF signals are then re-generated before down-conversion and demodulation. In the zero-IF mode, both outputs of the filter are digitised and processed in parallel before demodulation. By enabling analogue-to-digital conversion and channel filtering to be performed at low-IF on non-complex signals, use of just two non-complex ADCs is possible, thereby avoiding duplication of circuitry and providing significant power savings.

10 Claims, 9 Drawing Sheets

RADIO RECEIVER

The present invention relates to a radio receiver having particular, but not exclusive, application in digital communication systems such as GSM and UMTS, and to an integrated circuit comprising such a radio receiver.

Zero-IF receivers and near-zero-IF receivers (also known as polyphase receivers) are well known for use in radio communication systems. Both types of receiver attempt to achieve the same performance as traditional superhet receivers but have the advantage of being much easier to integrate, because there is no need for off-chip channel filters. For digital TDMA (Time Division Multiple Access) systems, such as GSM (Global System for Mobile communication) and DECT (Digital Enhanced Cordless Telecommunications), and analogue FM (Frequency Modulation) systems the zero-IF approach has not been particularly successful. This is because of difficulties associated with DC offsets and generation of second order intermodulation products which fall in the centre of the wanted signal band. Such signals cannot be filtered easily without damaging the wanted signal.

However in CDMA (Code Division Multiple Access) systems, such as the UMTS (Universal Mobile Telecommunications System) presently being defined, signal information is deliberately spread over a relatively wide band of frequencies. For CDMA systems, the zero-IF approach is more attractive because neither the DC offsets nor the spectrum holes produced by DC notch filters cause significant damage. This is because these effects are spread themselves by the subsequent de-spreading of the wanted signal such that they are comparatively harmless.

The polyphase receiver, as disclosed for example in European Patent Application 0,797,292, was developed for digital TDMA and analogue FM systems. Such a receiver does not suffer the same difficulties as the zero-IF receiver by virtue of using a low IF of half the channel spacing, so that the wanted signal is not so adversely affected by DC notch filters. It has been particularly successful in its application to DECT and GSM receivers. However, a weakness of the polyphase receiver is its rather limited adjacent channel rejection capability. Where this requirement exceeds 35dB, as it does in most CDMA applications, its use is not generally preferred.

Recent advances in both zero-IF and polyphase receiver architectures have concentrated on digitising the receiver as far as possible, as disclosed for example in International Patent Application WO 00/22735. This involves situating the Analogue-to-Digital Converter (ADC) immediately after the RF down-conversion process in the front end of the receiver, such that channel filtering is moved entirely from the analogue into the digital domain. Little or no Automatic Gain Control (AGC) is applied before the ADC. Hence the dynamic range of signals to be handled by the ADC is increased substantially, but the multi-mode capability of the receiver is greatly improved by the ease with which digital channel filters can be modified. Changing modes also no longer involves the complication of changing AGC algorithms since there is no AGC. Similarly, the need to extract Received Signal Strength Information (RSSI) from the analogue signal is eliminated. The increase in power consumption in the ADC is minimised by circuit design techniques such as those disclosed in WO 00/22735 together with advances in IC technology.

The third generation cellular standard UMTS is scheduled to be introduced soon in Europe and elsewhere. As well as voice, this will provide mobile users with data rates sufficient for multi-media services and Internet access. However, when it is first rolled-out the coverage offered will inevitably be limited, and therefore the first handsets will need to have a dual-mode capability (UMTS/GSM in Europe at least).

A major problem with the design of such a dual-mode receiver is to avoid the need for two separate receivers. An object of the present invention is therefore to provide a receiver architecture with maximum re-use of functional blocks as the receiver switches between UMTS and GSM modes. Particular design problems are presented by the preferred IF for UMTS being zero while that for GSM is 100 kHz (or half the channel spacing). The ADC and digital channel filters would ordinarily need to be complex for the low-IF GSM mode and non-complex for the zero-IF UMTS mode.

According to the present invention there is provided a radio receiver operable in a zero-IF and a low-IF mode, comprising an input for a radio frequency signal, quadrature down-conversion means coupled to the input for translating the radio frequency signal to an intermediate frequency and for generating in-phase and quadrature versions of the intermediate frequency signal, complex filtering means for operating on the in-phase and quadrature signals to provide filtered in-phase and quadrature signals and first and second analogue-to-digital conversion means for digitising each of the in-phase and quadrature signals, wherein means responsive to the receiver operating in the low-IF mode are provided for disabling operation of one of the first and second analogue-to-digital conversion means, low-IF digital signal processing means are provided for operating on a single digitised signal to generate decoded digital output data in the low-IF mode and zero-IF digital signal processing means are provided for operating on in-phase and quadrature digitised signals to generate decoded digital output data in the zero-IF mode.

By quantising only one of the in-phase and quadrature IF signals in the low-IF mode, the need for a complex (or polyphase) ADC and complex channel filters is eliminated thereby enabling considerable savings in power consumption. Further, one of the I and Q ADCs provided for use in the zero-IF mode acts as the ADC for use in the low-IF mode, thereby avoiding significant duplication of circuitry. Such a receiver is particularly suitable for multi-mode operation because design of non-complex ADCs to operate with a range of different clock speeds and noise-shaping profiles is much simpler than design of their complex counterparts.

By quantising only the I or Q component of the IF output from the receiver front-end in the low-IF mode, the wanted signal bandwidth is effectively doubled to match the quantisation bandwidth of the single ADC being reflected about zero frequency. However, despite a likely increase in clock speed resulting from this increased bandwidth the overall power consumption should be reduced since only a single ADC is used.

Because of a lack of image rejection by a non-complex ADC in the low-IF mode, a complex filter is required prior to the ADC. Such a filter may be a passive polyphase filter which, being passive, consumes no extra power. The filter may optionally be switched out of circuit when the receiver operates in zero-IF mode.

In a preferred embodiment, the ADC is a sigma-delta ADC. In another preferred embodiment, the digital in-phase and quadrature signals are de-rotated to translate their frequency to baseband.

In a further embodiment of the invention the receiver is implemented in an integrated circuit.

Embodiments of the present invention will now be described, by way of example, with reference to the accompanying drawings, wherein.

In the drawings the same reference numerals have been used to indicate corresponding features.

The present invention will be described in the context of an embodiment comprising a dual-mode UMTS/GSM receiver. The configuration of the receiver for each mode separately will first be described, then the configuration of the complete dual-mode receiver.

Figure 1:
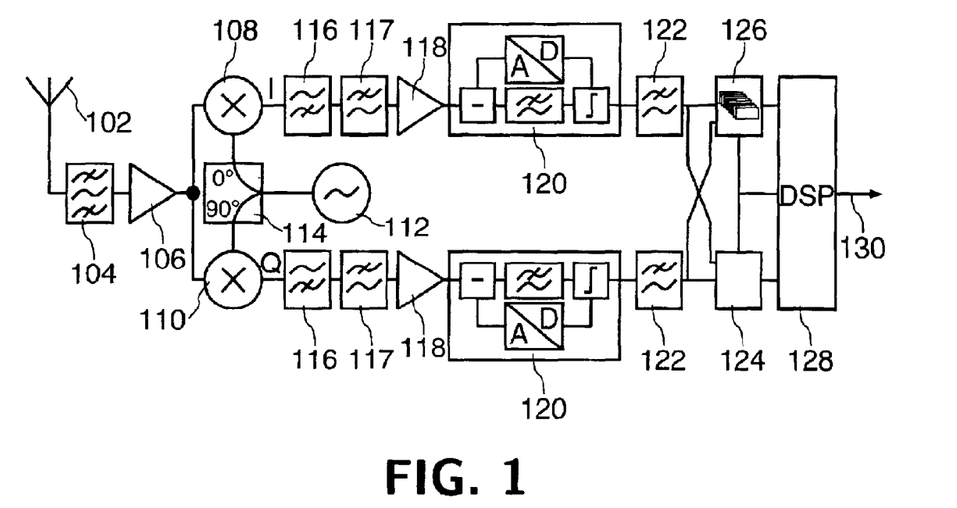
FIG. 1 is a block diagram of a zero-IF receiver architecture made in accordance with the present invention.

Consider first the UMTS mode. FIG. 1 is a block diagram of an embodiment of a zero-IF receiver architecture for UMTS made in accordance with the present invention. Radio signals are received by an antenna 102, filtered by a band-pass filter 104 and amplified by a low-noise amplifier 106. The signal is then mixed down to generate in-phase (I) and quadrature phase (Q) signals at zero frequency by first and second mixers 108,110, which mixers are supplied with signals from a Local Oscillator (LO) 112 at their respective LO ports via a phase shifting block 114 which provides a signal with zero phase shift to the first mixer 108 and a signal with a 90° phase shift to the second mixer 110.

After down-conversion by the mixers 108,110 the signal is complex, with its I and Q components, and continues to be processed as a complex signal throughout the receiver until it is demodulated. The choice of a zero IF is particularly attractive for the UMTS mode because as well as minimising power consumption, the wanted signal is relatively tolerant of DC offsets produced in the front-end mixers or of the hole produced in its spectrum when the DC offsets are removed by a high-pass filter.

The wanted signal, as a spread spectrum signal, occupies a bandwidth of approximately 4 MHz, and in the subsequent de-spreading process later in the receiver, any DC offsets or spectrum holes are re-spread over the 4 MHz bandwidth, rendering them of little or no significance. Furthermore, in using a zero IF any problems with interferers that might have occupied an image band are eliminated because there is no image band outside that of the wanted signal. Imbalances of I and Q in the signal chain generate a co-channel image that generally only gives rise to a small increase in the noise figure of the receiver. Such imbalances impose no limitations on the adjacent channel rejection of the receiver, which is easily capable of meeting the 35 dB or so required.

Figure 2:
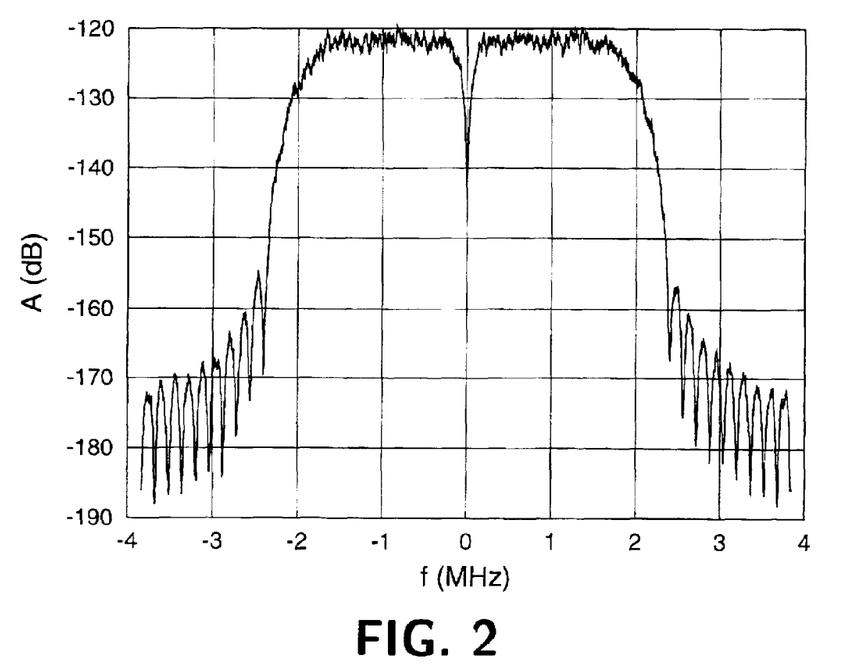
FIG. 2 is a graph illustrating the amplitude (A) against frequency (f) in MHz of signals after down-conversion and pre-filtering by the architecture of FIG. 1.

The I and Q signal components are now passed through respective high-pass and low-pass pre-filters 116,117. Each high-pass filter 116 comprises a first-order high-pass element, which inserts a DC notch into the signal, while each low-pass filter 117 comprises a single low-pass element which attenuates the power in large interferers at large offset frequencies (for example the blocking interferers at 60 MHz and 85 MHz specified in the UMTS standard). A typical frequency spectrum at the output of one of the low-pass filters 117 is shown in FIG. 2, in this embodiment having a DC hole which is 200 kHz wide. The I and Q signals are next amplified by respective two-level AGCs 118, which ensure that the wanted signal always falls within the available dynamic range of respective sigma-delta ADCs 120. Each AGC circuit 118 simply reduces the gain by a single step of 30 dB when the total power, including interferers, in the band of the wanted signal exceeds a predetermined threshold. Without this single step in gain, the dynamic range requirements for the ADCs 120 would be excessive.

The sigma-delta ADCs 120 quantise the I and Q components, thereby producing a pair of digital bitstreams. The modulators 120 are clocked at a frequency of approximately 40 times the UMTS chip rate (3.84 MHz), and include loop filters which re-distribute the quantisation noise so that most is concentrated at high frequencies well away from the band of the wanted signal. Digital channel filters 122 are configured to reject this high-frequency quantisation noise as well as any interferers in other channels that might be present at the input to the receiver.

Figure 3:
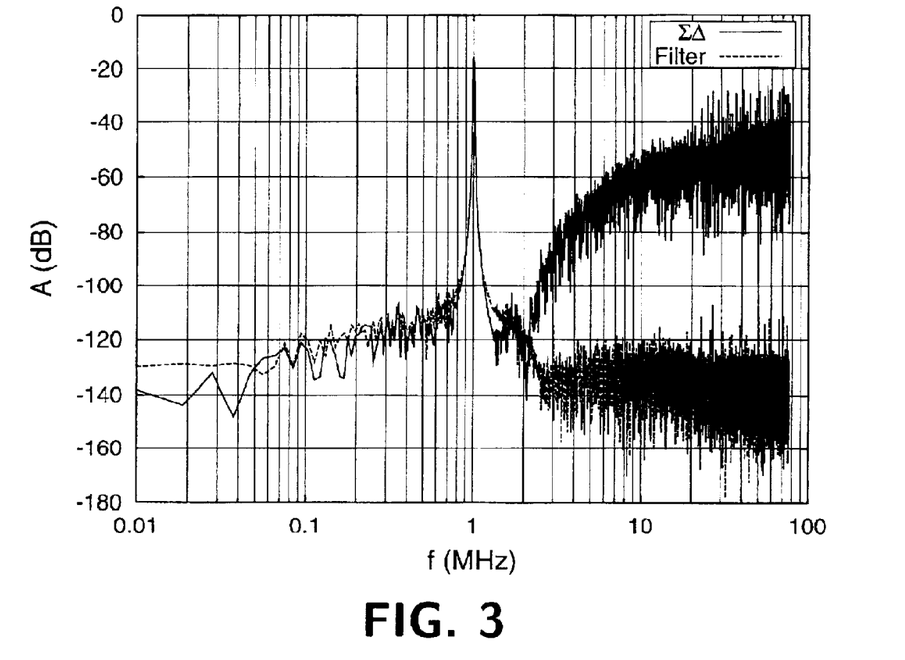
FIG. 3 is a graph illustrating the amplitude (A) against frequency (f) in MHz of signals at the output of the ADC, shown by a solid line, and after filtering, shown by a dashed line, in the architecture of FIG. 1.

Plots of the noise spectra are shown in FIG. 3, that at the output of a sigma-delta ($\Sigma\Delta$) modulator 120 shown by a solid line and that at the output of a digital channel filter 122 shown by a dashed line. The spectra were generated under test conditions of a single tone injected into the modulator 120 at maximum drive level. By measuring the total output power with and without the input tone, it can be verified that the available dynamic range of each ADC 120 is approximately 77 dB.

The digital channel filters 122 are typically of the root-raised cosine type, matched to the characteristics of the baseband filters used by a base station for transmission. Their lengths must be minimised for low power consumption but made long enough to ensure acceptable levels of intersymbol interference and adequate rejection of interference. Decimation of the digitised signals also takes place in these filters, reducing the sampling rate to approximately eight times the chip rate. In some embodiments, each filter may be split into several stages of decimation.

The remainder of the baseband signal processing in the system of FIG. 1 is similar to that used in a more conventional CDMA receiver. A searcher 124 attempts to locate signals encoded with an appropriate code and passes timing information to a rake receiver 126, which despreads, detects and combines spread-spectrum signals received over a multipath channel. Output from the searcher 124 and rake receiver 126 is further processed by a Digital Signal Processor (DSP) 128 to generate an output bitstream 130 comprising the decoded UMTS bitstream. This bitstream 130 may then be processed conventionally to generate suitable output, for example audio or data signals.

The highly digitised nature of the architecture described above largely eliminates the need for analogue channel filters and AGC. This is particularly useful when the need to switch to a GSM mode is considered. Although the architecture places heavy demands on the performance of the ADCs 120, the design is feasible, and advances in integrated-circuit technology will also help to reduce power consumption.

Figure 4:
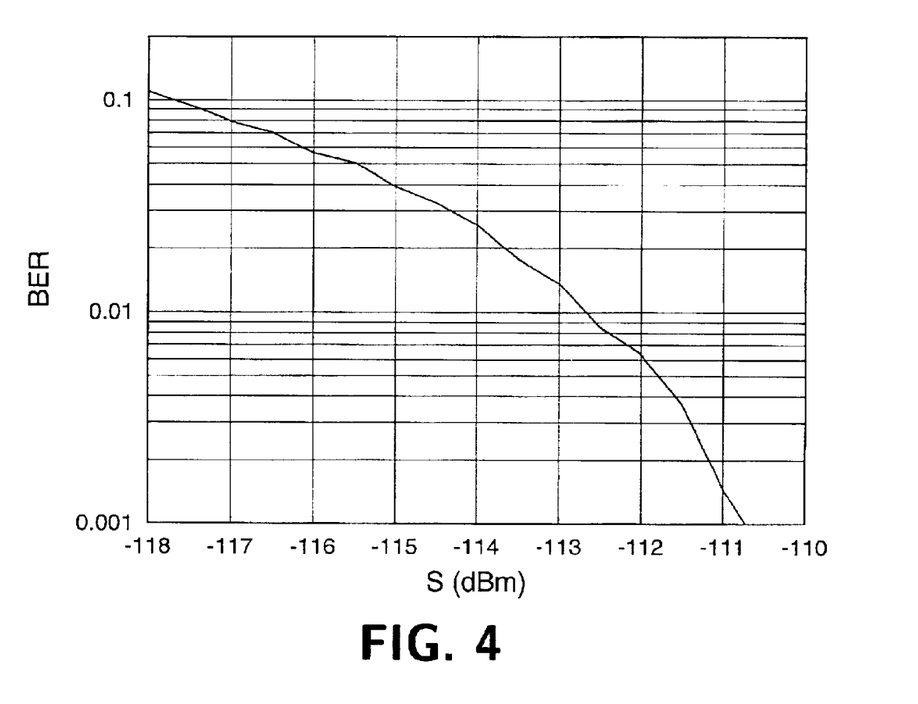
FIG. 4 is a graph of simulated bit error rate (BER) of raw data bits against signal power (S) in dBm for the receiver architecture of FIG. 1.

System simulations have been performed to verify that the architecture will meet the UMTS performance requirements. An example of the output of such a simulation is presented in FIG. 4, showing the variation in bit error rate (BER) for raw data bits as a function of wanted signal power S in dBm. In this simulation the receiver noise figure was assumed to be 8.5 dB and the raw bit rate 60 kHz. When a 9 dB coding gain is taken into consideration for a 12.2 kB/s service, the results indicate that the receiver should achieve a BER for information bits of 0.1% at a wanted signal input level of approximately −120 dBm, which is 3 dB inside the UMTS specification of −117 dBm.

Now consider the GSM mode. Because of difficulties with DC offsets and second-order intermodulation products generated in the front-end mixers, a low IF of half the channel spacing is preferred for GSM. This allows high-pass filters to be inserted in the I and Q signal paths of the complex IF signal so that the offsets and intermodulation products can be extracted without damaging the modulation of the signal. However, this IF introduces the added complication that in order to reject all interferers incident on the receiver, including an adjacent-channel interferer in the image band of the wanted signal (i.e. at −100 kHz), the channel filter and ADC both have to be complex. A complex digital filter typically consumes twice as much power as a pair of real filters and a complex ADC is substantially more difficult to design than a real version. In conjunction with the needs imposed by having a UMTS mode of operation, there is a strong need for a receiver able to use real channel filters and ADCs in both modes.

Figure 5:
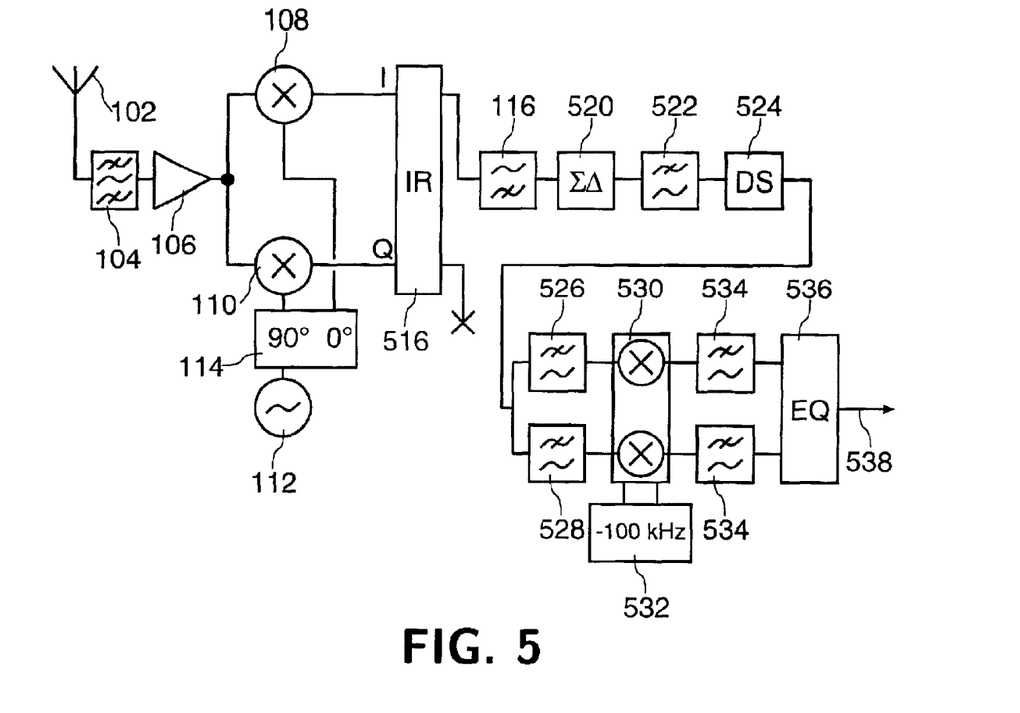
FIG. 5 is a block diagram of a low-IF receiver architecture made in accordance with the present invention.

An architecture which meets this requirement is disclosed in applicant's co-pending unpublished United States patent application (applicant's reference PHGB000156) and illustrated in FIG. 5, which is a block diagram of a GSM embodiment of a low-IF receiver architecture. The front end uses a quadrature down-converter to mix incoming RF signals down to a low IF of half the channel spacing (for GSM the channel spacing is 200 kHz and hence the IF is 100 kHz). This part of the receiver is essentially the same as that described above with reference to FIG. 1, the only difference being the frequency supplied by the local oscillator 112.

After down-conversion by the mixers 108,110 the complex low-IF signal, comprising I and Q signals, passes into an image rejection filter (IR) 516, which is a passive polyphase filter which rejects any interferer present in the image band of the wanted signal, namely between −200 kHz and 0 Hz. Such filters are known, as disclosed for example in the paper "Single sideband modulation using sequence asymmetric polyphase networks" by M J Gingell, Electric Communications, No 48, 1973. Passive polyphase filters are easily realised as an RC network which is straightforward to integrate on silicon. The image rejection filter 516 passes wanted signals in the band 0 Hz to +200 kHz as well as all other interferers. However, by eliminating any image interference it allows all subsequent filters in the receiver to be "real" (i.e. to operate on just one of the I and Q signals). Since the filter 516 is passive, it consumes no power and can be regarded as loss-free as far as the wanted signal is concerned.

Figure 6:
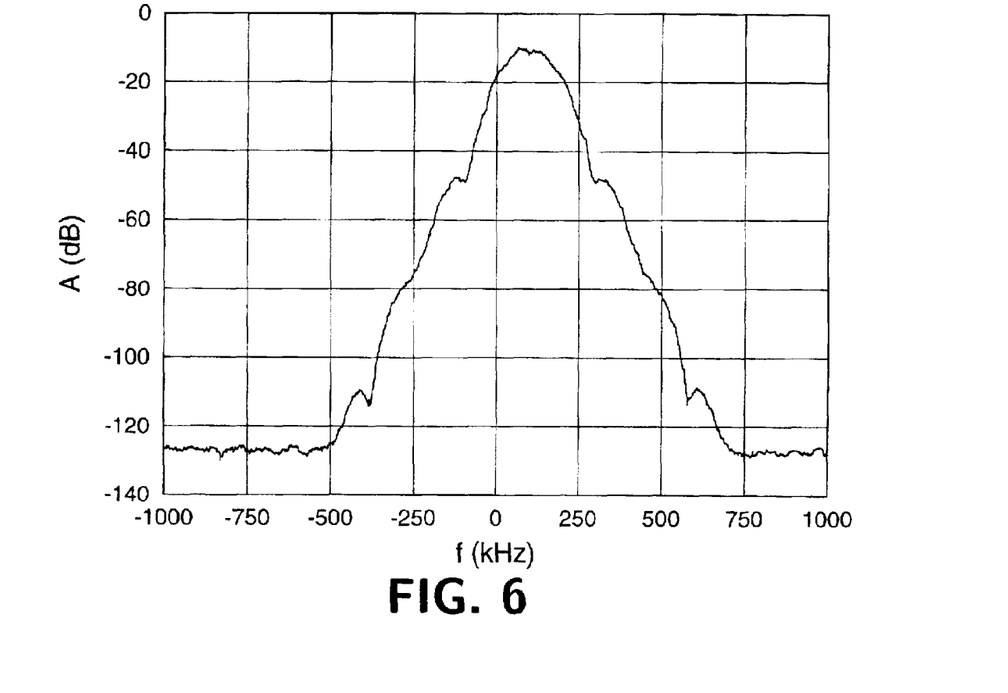
FIG. 6 is a graph illustrating the amplitude (A) against frequency (f) in kHz of signals at the input of the image rejection filter in the architecture of FIG. 5.

To illustrate the effect of the polyphase filter 516, spectra of a likely wanted signal will be examined at the input and output terminals of the filter. FIG. 6 shows a simulated input spectrum of a GSM signal at a level of 0 dBm and an IF of 100 kHz, driven by a random series of data bits. The spectrum is that of an undistorted GMSK (Gaussian Minimum Shift Key) signal in the presence of white, Gaussian noise generated by the receiver front end. It is worth noting that the power in the signal at negative frequencies is only 15.9 dB below the power in the entire signal. The relevance of this is that it implies that even if the polyphase filter 516 were able to extract all the energy in an adjacent-channel interferer falling into the band −200 kHz to zero, neither this receiver nor any other GSM receiver could operate with an interferer arriving at +15.9 dB with respect to the wanted signal. Fortunately the GSM specification requires the receiver to operate with an adjacent channel interferer at only +9 dB with respect to the wanted signal, and in this case the spillage of energy into the wanted band is low enough to achieve an acceptable signal-to-noise ratio.

Figure 7:
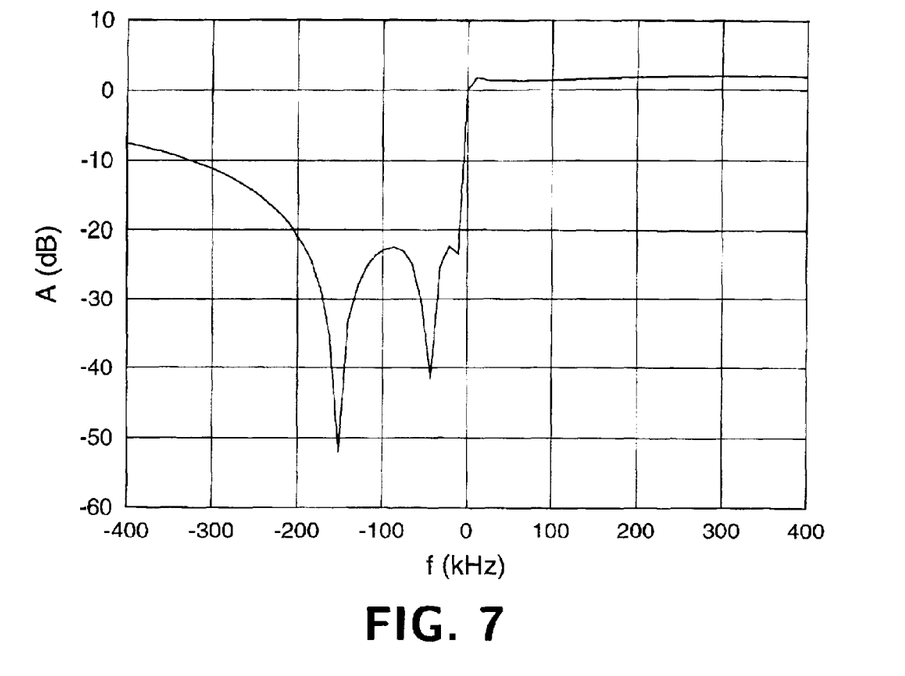
FIG. 7 is a graph illustrating the attenuation (A) in dB against frequency (f) in kHz of the image rejection filter in the architecture of FIG. 5.
Figure 8:
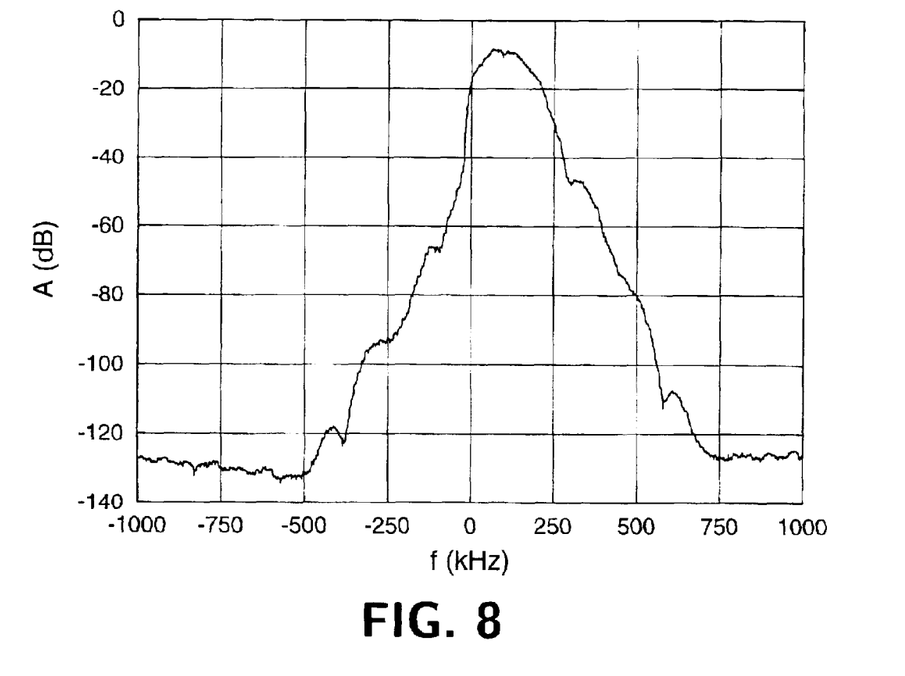
FIG. 8 is a graph illustrating the amplitude (A) against frequency (f) in kHz of signals at the output of the image rejection filter in the architecture of FIG. 5.

For the image filter 516, the implication is that the attenuation it provides in the adjacent channel is not likely to be the main limiting factor on receiver performance. Hence, the filter need not provide an attenuation of much greater than 20 dB. An example of the frequency response of a suitable polyphase filter is shown in FIG. 7. After filtering by such a filter, the spectrum of the wanted signal of FIG. 6 is modified to that shown in FIG. 8. The asymmetry introduced by the filter is clearly visible, but is not sufficient to cause any significant degradation in BER when (as in the described embodiment) an equaliser is used as part of the demodulation process.

Figure 9:
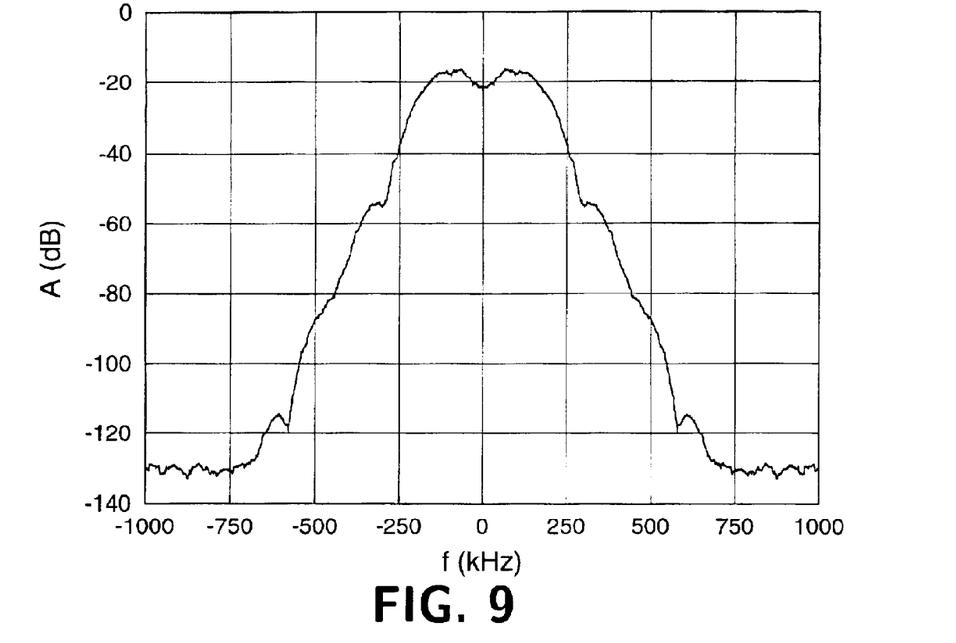
FIG. 9 is a graph illustrating the amplitude (A) against frequency (f) in kHz of signals at the output of the image rejection filter after termination of the Q component of the signal in the architecture of FIG. 5.

After the image rejection filter 516 the Q component of the signal is terminated, while the I component continues through a high-pass filter 116 to a single, two port sigma-delta ($\Sigma\Delta$) modulator 520. The effect of dropping the Q component of the signal is to take half of the wanted signal energy and fold it over onto the negative side of the frequency spectrum. Hence the signal (in common with the noise spectrum of the sigma-delta modulator 520) is symmetrical about zero frequency and occupies a bandwidth of 400 kHz. As an example, FIG. 9 shows the spectrum of the wanted signal output from the filter 516 (shown in FIG. 8) with the Q component removed. Such a signal maximises the conversion efficiency of the modulator 520. This is because the bandwidth of the signal now matches the width of the hole in the quantisation noise spectrum produced by the modulator 520, thereby improving the conversion efficiency of the ADC 520 by at least 3 dB.

The high-pass filter 116 removes DC offsets generated by the preceding front-end circuitry. Studies of polyphase receivers for GSM applications have shown that a suitable cut-off frequency for the filter 116 is 10 kHz or less, which gives the receiver an adequate recovery time from the over-drive effects of large signals without causing any significant degradation of the wanted signal.

The order of the modulator 520 and its clock speed must be chosen to give the required noise shaping. At minimum input signal level (−108 dBm in the state of the art), signal-to-quantisation-noise ratio must be about 17 dB in a 400 kHz bandwidth (i.e. −200 kHz to +200 kHz) in order to meet the GSM specification for BER (Bit Error Rate). This figure is derived from the need for an overall signal-to-noise ratio of 7 dB and a quantisation noise level which is 10 dB below that of the front-end noise. The largest input signal to the ADC is a blocking interferer at −23 dBm. When sensitivity requirements and interferer levels are taken into consideration, the dynamic range required for GSM is a difficult, but feasible, value of approximately 85 dB.

Figure 10:
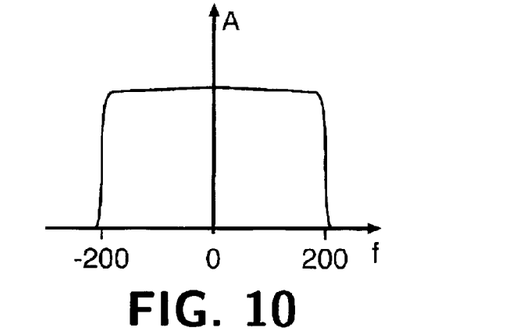
FIG. 10 is a graph illustrating the attenuation (A) against frequency (f) in kHz of the channel filter in the architecture of FIG. 5.

The output of the ADC 520 is a high-speed bitstream which contains both the wanted signal and a large quantity of high-frequency quantisation noise. The output signal is filtered by a digital channel filter 522. This filter runs at a sampling rate equal to the clock rate of the sigma-delta modulator 520, which is typically of the order of 48 times the bit rate for GSM. It has a low-pass frequency response with a cut-off frequency of approximately 200 kHz which, when viewed on a double-sided frequency axis, resembles a band-pass response of width 400 kHz. The precise shape of the frequency response of the filter 522 is not particularly critical, as long as it provides sufficient stop-band attenuation to allow decimation of the signal samples down to a sampling rate of about 1 MHz (approximately four times the GSM bit rate of 270.8333 kHz). A suitable frequency response is illustrated in FIG. 10. The filter 522 has the dual role of attenuating all interferers arriving at the receiver input except an image interferer (i.e. an interferer in the lower adjacent channel, which is handled by the image rejection filter 516) and of attenuating most of the wideband quantisation noise produced by the modulator 520. The combination of real quantisation and filtering of the wanted signal is more efficient than the equivalent complex signal processing used in known low-IF receivers.

Figure 11:
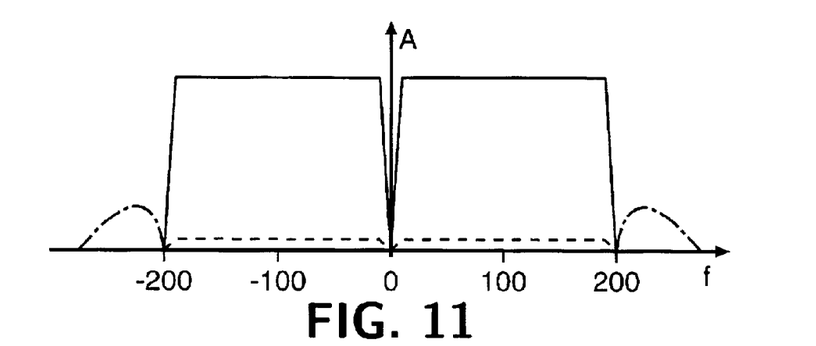
FIG. 11 is a graph illustrating the amplitude (A) against frequency (f) in kHz of signals at the output of the channel filter in the architecture of FIG. 5.

A typical frequency spectrum of signals at the output of the filter 522 is shown in FIG. 11. The two halves of the wanted signal, shown as a solid line, are located on either side of zero frequency, separated by the hole produced by the high-pass filter 116. The residue of an image interferer, shown as a dashed line, occupies the same frequency space as the wanted signal but at a level that should be insignificant because of the attenuation applied by the image rejection filter 516. Outside the −200 kHz to +200 kHz band there may also be some residual sigma-delta noise, shown as a chain-dashed line, and power due to large interferers, but such signals can be removed easily by subsequent filtering.

Once the high frequency content of the signal has been removed by the channel filter 522 the IF signal can be down-sampled (i.e. decimated) by a down-sampling block (DS) 524 to a sampling rate of approximately four times the GSM bit rate. This reduces the required processing resources and power consumption for the reconstruction of the Q component of the wanted signal. In some embodiments the down-sampling may be combined with the channel filtering for better efficiency. It is necessary to make the wanted signal complex again to facilitate its perfect frequency translation (or de-rotation) back from the low IF to zero frequency, and its subsequent demodulation to obtain data bits.

Hence, after down-sampling, the signal is made complex by passing it to a pair of FIR filters, a first filter 526 having a linear-phase low-pass response and a second filter 528 having an identical response except for the creation of a narrow notch in the middle of the passband and the insertion of an extra 90° phase shift (the phase shift being +90° for negative frequencies and −90° for positive frequencies). The second filter 528 creates the new Q component, performing the equivalent of a time-bounded Hilbert transform, with the width of the notch determining the length of its impulse response. A width of slightly less than or equal to that of the notch generated by the preceding high-pass filter 116 would normally be appropriate.

Figure 12:
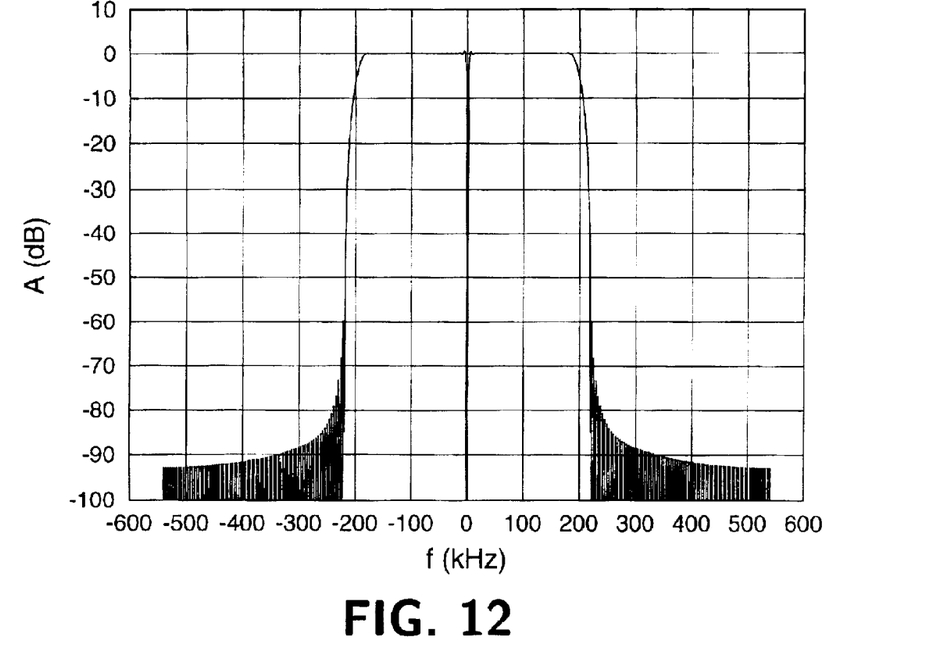
FIG. 12 is a graph illustrating the attenuation (A) against frequency (f) in kHz of a quadrature reconstruction filter in the architecture of FIG. 5.

FIG. 12 shows a typical frequency response of a suitable second filter 528, this particular example being a FIR filter having 276 taps, with a hole width of 8 kHz. The principal function of the first filter 526 is to insert exactly the same time delay into the path of the I component as that inserted in the path of the Q component by the second filter 528. The impulse responses of both filters 526,528 should be exactly the same length. The first and second filters can be designed to give further suppression of any interference remaining after the channel filter 522 outside the bandwidth of the wanted signal. Changing their cut-off frequency has virtually no effect on the required length of the filters 526,528, and gives the possibility of introducing extra filtering that comes effectively for free. The choice of cut-off frequency has some relevance to the sampling rate required by the filters 526,528, but provided this does not give rise to any significant problems the filtering thereby provided may alleviate the need for any further filtering in the baseband.

Figure 13:
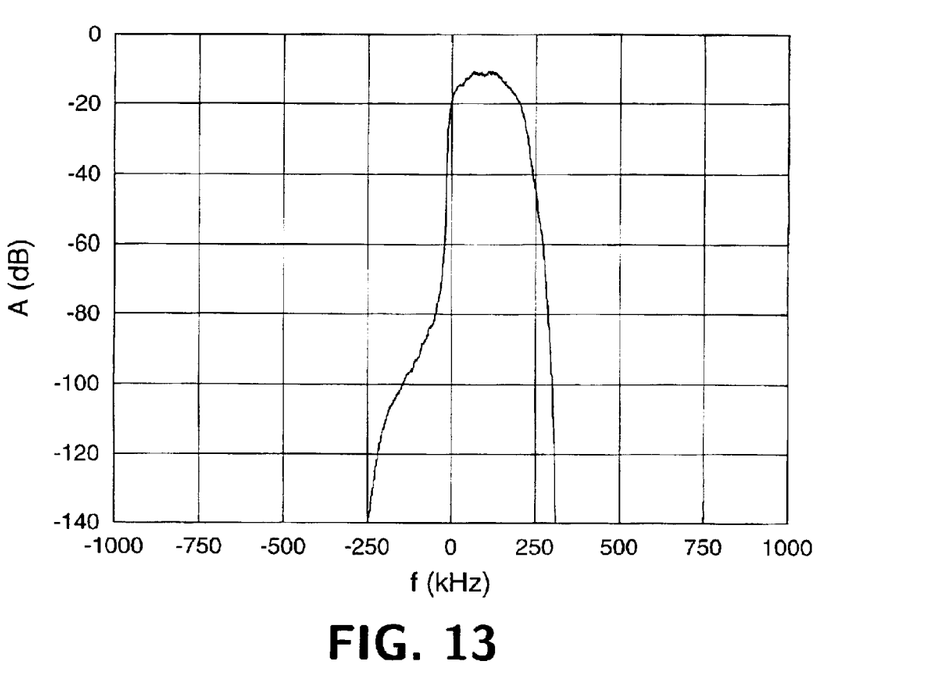
FIG. 13 is a graph illustrating the amplitude (A) against frequency (f) in kHz of signals after restoration of the Q component of the signal in the architecture of FIG. 5.

Restoring the Q component of the wanted signal has the effect of folding the negative half of its frequency spectrum back onto the positive side, whereby the bandwidth reduces back to 200 kHz. The total power in the signal therefore returns to the original value seen at the input to the image rejection filter 516. The power density is increased by 6 dB. FIG. 13 shows the simulated frequency spectrum of the signal of FIG. 9 after the various processing steps described above. It should be noted that the energy at negative frequencies is a consequence of the finite length of the two FIR filters 526,528, leading to a slightly imperfect image rejection ratio. The abrupt cut-off at approximately 270 kHz is a result of a low-pass edge deliberately incorporated in the characteristics of the two filters 526,528.

Once the Q component has been created, the I and Q signals pass to a derotation block 530 where they are derotated to baseband, by performing a complex multiplication with a complex tone of −100 kHz provided by a signal source 532, which derotation shifts the wanted signal back to a central frequency of zero. By virtue of being digital, the de-rotation process is perfect.

Figure 14:
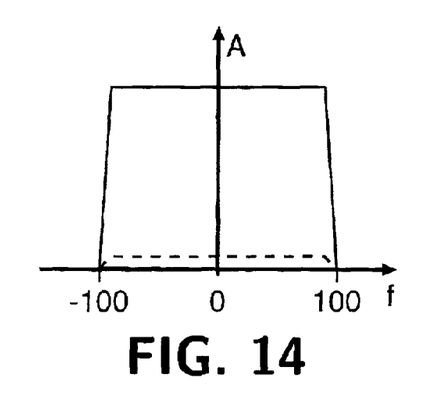
FIG. 14 is a graph illustrating the amplitude (A) against frequency (f) in kHz of signals immediately before equalisation and demodulation in the architecture of FIG. 5.

In the example embodiment shown in FIG. 5, the I and Q signals are filtered by respective low-pass baseband filters 534, having a cut-off frequency of 80 kHz. The baseband filters 534 are only required if the extra filtering mentioned above has not been included in the filters 526,528. A typical frequency spectrum of signals at the output of a filter 534 is shown in FIG. 14, with the wanted signal shown as a solid line and the residue of an image interferer shown as a dashed line. The interferer will be of no consequence if the image rejection filter 516 is dimensioned correctly.

The signals are then processed by an equalisation and demodulation block (EQ) 536 before being provided as output 538, at the raw GSM bit rate of 270.833 kHz, to digital signal processing circuitry in the remainder of the receiver.

Figure 15:
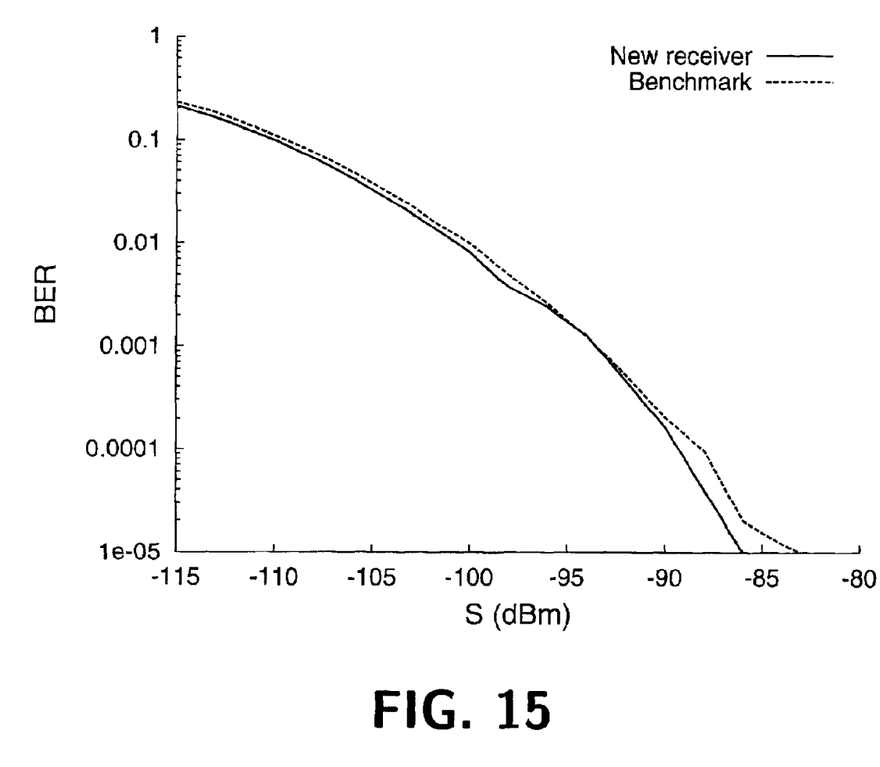
FIG. 15 is a graph of simulated bit error rate (BER) against signal power (S) in dBm for the receiver architecture of FIG. 5.

System simulations have been performed to verify the correct functioning of an architecture in accordance with the present invention. As an example, FIG. 15 is a graph of results of a simulation determining BER for a range of wanted signal powers S, in dBm, using a well-known TU50 channel model (typical urban profile with a maximum speed of 50 km/h). Simulated results for the new receiver architecture are shown as a solid line, while results for a benchmark polyphase receiver, using complex signal processing throughout, are shown as a dashed line. It is evident that the sensitivity of the new receiver is at least as good as the benchmark polyphase receiver. Other simulations have also verified that the new architecture can provide the required selectivity, both for adjacent channels and for those at larger frequency offsets.

In a variation on the GSM mode embodiments described above, the channel filter 522 and complex signal reconstruction filters 526,528 are combined into a single filtering block comprising two FIR filters. Such an embodiment can require less digital hardware resources as the combined filtering block can exploit the bit-stream property of the output of the sigma-delta modulator 520. In effect, the functions of the channel filter 522 and down-sampling block 524 are incorporated in the filters 526,528.

To determine the required frequency response of the filters 526,528, it is simpler to consider the filters as a single complex filter, having an asymmetrical response about zero frequency, rather than two real filters one of which is the Hilbert transform of the other. Using a standard digital synthesis tool, a single, real FIR filter can be designed having the required bandwidth and selectivity. Obtaining the complex response is then a straightforward matter of applying a +100 kHz frequency shift. Real and imaginary impulse responses can be obtained by performing an inverse discrete Fourier transform on the shifted frequency response.

Figure 16:
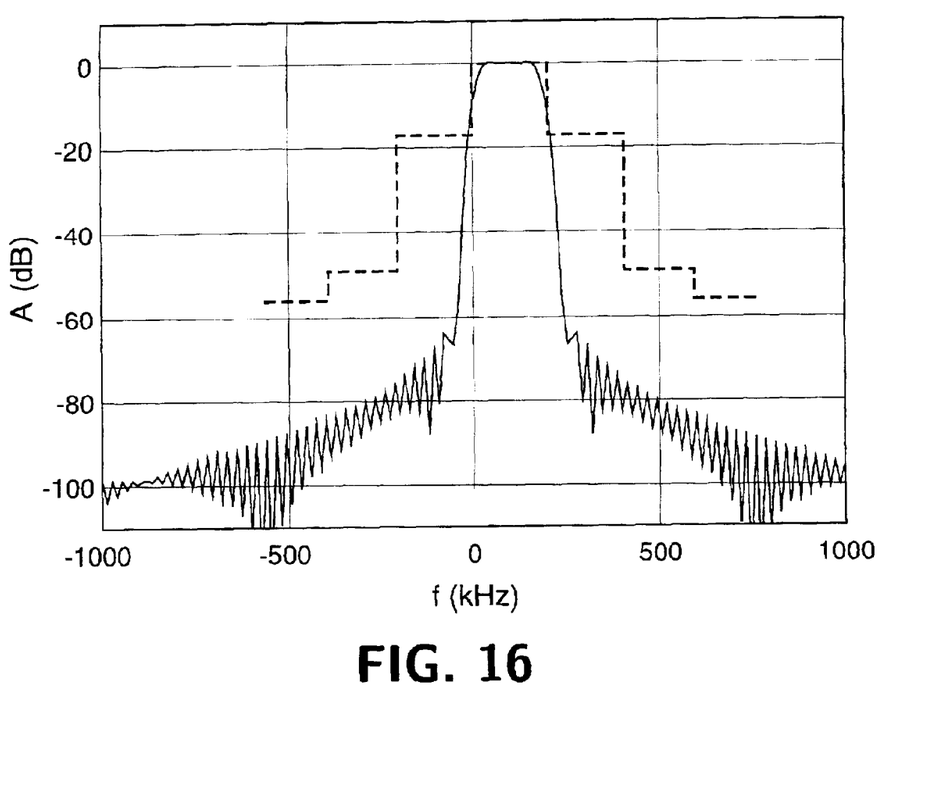
FIG. 16 is a graph illustrating the attenuation (A) against frequency (f) in kHz of a combined channel filter and quadrature reconstruction filter.

FIG. 16 illustrates the complex frequency response of a suitable pair of filters 526,528, obtained after a small number of design iterations. The required attenuation template is shown as a dashed line. The response displays a very small ripple over the passband, from 20 kHz to 180 kHz, with a stopband attenuation that is well within the bounds of the template exceeding 100 dB at frequencies beyond ±1 MHz). Such a response permits the filters 526,528 to pass the wanted signal with minimal distortion, apply sufficient attenuation to adjacent- and alternate-channel interferers and reject most of the high frequency noise generated by the sigma-delta modulator 520.

Figure 17:
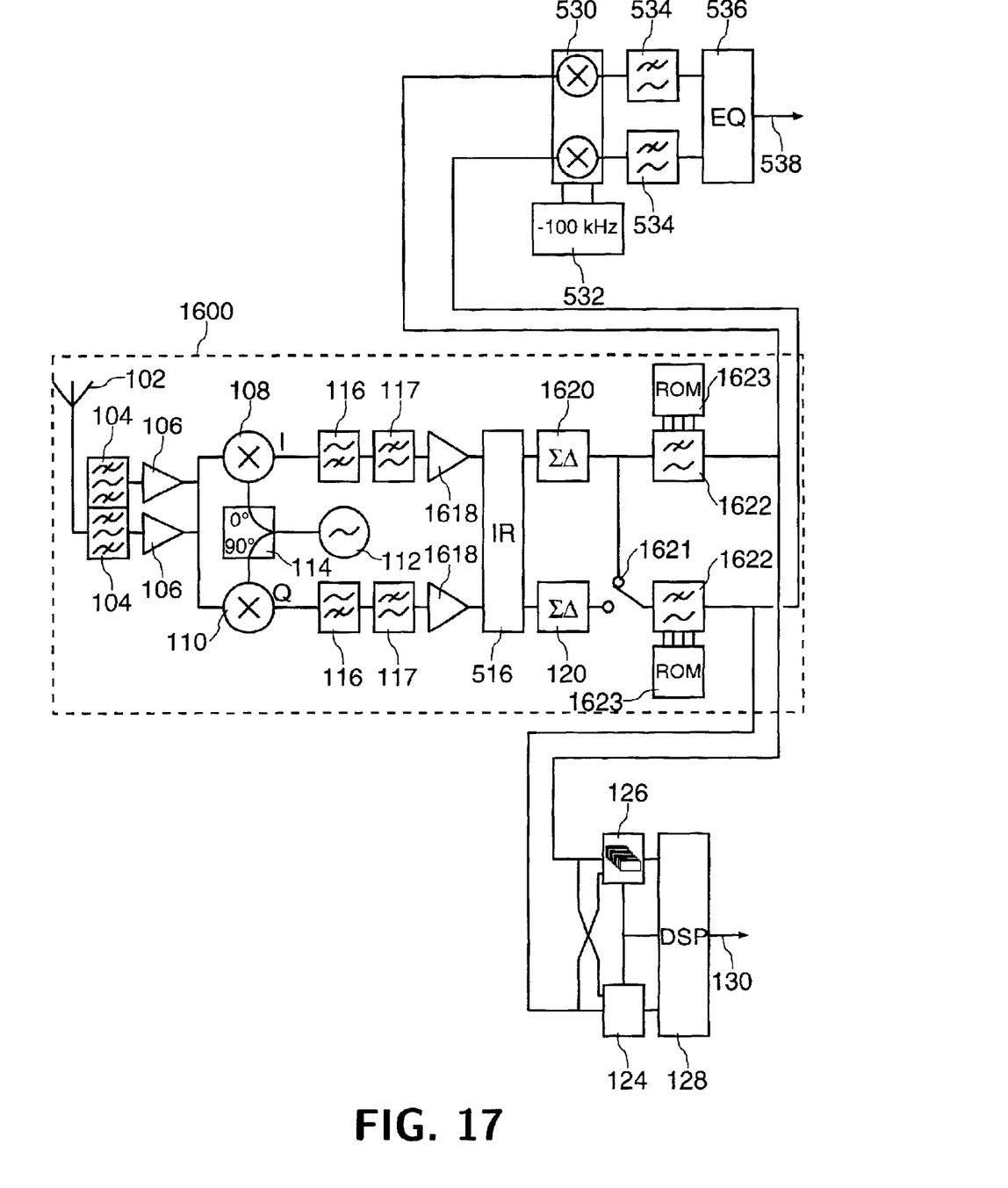
FIG. 17 is a block diagram of a dual-mode zero-IF and low-IF receiver architecture made in accordance with the present invention.

Finally, consider the combined dual-mode UMTS and GSM receiver. FIG. 17 is a block diagram of an embodiment of such a receiver made in accordance with the present invention. The RF front end, as far as the mixers 108,110 is similar to that of the UMTS and GSM modes, the main differences being the need for respective band-pass filters 104 and low-noise amplifiers 106 for UMTS and GSM frequency bands and the requirement that the LO 112 can supply suitable reference frequencies for both modes to the mixers 108,110.

The wanted signal appears at the output of the quadrature down-converter mixers 108,110, the UMTS signal occupying a band of −2 to +2 Mhz on a zero-IF carrier and the GSM signal occupying a band of zero to 200 kHz on a low-IF carrier. The embodiment shown here has not been designed to handle simultaneous operation of the two modes.

The signals pass through a high-pass and low-pass filters 116,117, as used in the UMTS embodiment described above.

The high-pass filters 116 generate a notch in the UMTS signal, but the notch is sufficiently small (typically no more than −10 to +10 kHz) that it has no significant effect on the UMTS signal. The low-pass passive pre-filters 117 attenuate any large UMTS interferers at offsets of 60 MHz or more. Three-level AGC amplifiers 1618 ensure that the signal falls into the available ADC dynamic range: two of the levels provide same functionality as the AGC circuit 118 of FIG. 1 when the receiver is operating in UMTS mode, namely reducing the gain by a single step of 30 dB when the signal level exceeds a predetermined level; the third level is used when the receiver is operating in GSM mode to provide a suitable signal level for subsequent analogue-to-digital conversion. The third level is simply required to compensate for differences in signal levels between the UMTS and GSM modes.

The signals next pass through a polyphase image-rejection filter 516. This filter is not necessary for the UMTS mode, and may therefore be bypassed. However, it is likely that the damage caused to the UMTS signal is not significant, in which case the filter 516 can remain in place for both modes, thereby saving some signal switching. The I and Q signals then pass to respective sigma-delta modulators 1620,120. The Q modulator 120 is identical to that for the UMTS embodiment described above, and only operates in UMTS mode. The I modulator 1620 must be reconfigurable for the two modes. In the UMTS mode suitable values for the loop bandwidth and clock speed are 20 MHz and 153.6 MHz respectively, while in the GSM mode they are 3 MHz and 26 MHz respectively. In practice it may be preferable for the ADCs 1620,120 to be identical to avoid differences in I and Q channel processing in the UMTS mode.

After digitisation the resultant bitstream or bitstreams pass through respective combined channel and decimation filters 1622, which filters are programmable via settings held in ROM 1623 for the UMTS and GSM modes. In the GSM mode the filters 1622 also perform the complex signal reconstruction function. A switch 1621, shown here in its GSM mode position, arranges for correct routing of the signals. The remainder of the digital signal processing proceeds in the manner described above for each of the modes.

It can be seen that a substantial part of the analogue and digital hardware is common to both modes, this common part 1600 being enclosed within a dashed line in FIG. 17. The digital baseband signal processing blocks for the two modes are quite different, because of the different demodulation processes involved. However, the software elements of this processing may be configured to run on a common DSP platform, thereby increasing still further the amount of common circuitry.

It will be appreciated that the position of some functional blocks may be varied in the above embodiments within the scope of the present invention. For example, in the embodiment of FIG. 1 the position of the high-pass filter 116 and low-pass filter 117 is immaterial. Similarly, in FIG. 5 the high-pass filter 116 could equally well be situated before the image-rejection filter 516. As a further example, the channel filter 522, down-sampling block 524 and complex signal regeneration filters 526,528 can be merged into a single functional block, with some savings in digital processing hardware, as discussed above.

The receiver architecture of the present invention has been described above in relation to a dual-mode UMTS/GSM receiver in which the IF switches between zero and 100 kHz. However, the architecture can readily be adapted to a range of other dual-mode and multi-mode combinations CDMA, TDMA and FDMA applications. Likely combinations include IS95, CDMA2000, IS136, AMPS and PDC1900.

What is claimed is:

1. A radio receiver operable in a zero-IF and a low-IF mode, comprising an input for a radio frequency signal, quadrature down-conversion means coupled to the input for translating the radio frequency signal to an intermediate frequency and for generating in-phase and quadrature versions of the intermediate frequency signal, complex filtering means for operating on the in-phase and quadrature signals to provide filtered in-phase and quadrature signals and first and second analogue-to-digital conversion means for digitising each of the in-phase and quadrature signals, wherein means responsive to the receiver operating in the low-IF mode are provided for disabling operation of one of the first and second analogue-to-digital conversion means, low-IF digital signal processing means are provided for operating on a single digitised signal to generate decoded digital output data in the low-IF mode and zero-IF digital signal processing means are provided for operating on in-phase and quadrature digitised signals to generate decoded digital output data in the zero-IF mode.

2. A receiver as claimed in claim 1, characterised in that the complex filtering means comprises a polyphase filter.

3. A receiver as claimed in claim 1, characterised in that the complex filtering means are passive.

4. A receiver as claimed in claim 1, characterised in that means responsive to the receiver operating in the zero-IF mode are provided for switching the complex filtering means out of the paths of the in-phase and quadrature signals.

5. A receiver as claimed in claim 1, characterised in that the analogue-to-digital conversion means comprises a sigma-delta analogue-to-digital converter.

6. A receiver as claimed in claim 1, characterised in that the analogue-to-digital conversion means are operable at a plurality of different clock speeds.

7. A receiver as claimed in claim 1, characterised in that the low-IF digital signal processing means includes derotation means for translating the digital in-phase and quadrature signals to baseband.

8. A receiver as claimed in claim 1, characterised in that the low-IF digital signal processing means includes signal generation means for operating on the digitised signal to generate digital in-phase and quadrature signals.

9. A receiver as claimed in claim 8, characterised in that the signal generation means comprises first and second low pass filters and in that the phase shift applied to signals passed through each of the filters differs by 90°.

10. A receiver as claimed in claim 9, characterised in that the filters have a linear-phase characteristic.

* * * * *